United States Patent
Tomioka et al.

(10) Patent No.: US 8,278,389 B2
(45) Date of Patent: *Oct. 2, 2012

(54) EPOXY RESIN COMPOSITION, PREPREG, FIBER-REINFORCED COMPOSITE MATERIAL

(75) Inventors: Nobuyuki Tomioka, Ehime (JP); Hiroaki Sakata, Ehime (JP); Shiro Honda, Ehime (JP); Takayuki Fujiwara, Ehime (JP)

(73) Assignee: Toray Industries, Ltd., Tokyo (JP)

( * ) Notice: Subject to any disclaimer, the term of this patent is extended or adjusted under 35 U.S.C. 154(b) by 25 days.

This patent is subject to a terminal disclaimer.

(21) Appl. No.: 12/599,915

(22) PCT Filed: May 12, 2008

(86) PCT No.: PCT/JP2008/058699
§ 371 (c)(1),
(2), (4) Date: Nov. 12, 2009

(87) PCT Pub. No.: WO2008/143044
PCT Pub. Date: Nov. 27, 2008

(65) Prior Publication Data
US 2010/0209642 A1 Aug. 19, 2010

(30) Foreign Application Priority Data
May 16, 2007 (JP) ................... 2007-130138

(51) Int. Cl.
*B32B 1/08* (2006.01)
*C08L 63/00* (2006.01)
*C08L 63/02* (2006.01)
(52) U.S. Cl. ...................... 525/92 H; 428/36.4
(58) Field of Classification Search .............. None
See application file for complete search history.

(56) References Cited

U.S. PATENT DOCUMENTS

| | | | |
|---|---|---|---|
| 4,500,660 A | | 2/1985 | Minamisawa et al. |
| 6,894,113 B2 * | | 5/2005 | Court et al. ............ 525/88 |
| 2004/0034124 A1 | | 2/2004 | Court et al. |
| 2004/0039120 A1 * | | 2/2004 | Takeyama et al. ........ 525/107 |
| 2007/0078236 A1 * | | 4/2007 | Bonnet et al. ............. 525/529 |
| 2008/0051511 A1 * | | 2/2008 | Guerret et al. ............. 525/92 F |
| 2009/0198012 A1 * | | 8/2009 | Sakata et al. ............. 524/606 |

FOREIGN PATENT DOCUMENTS

| | | |
|---|---|---|
| CN | 1441830 A | 9/2003 |
| EP | 1 724 306 A1 | 11/2006 |
| EP | 2 036 950 A1 | 3/2009 |
| FR | 2 880 895 A1 | 7/2006 |
| JP | 62-1717 A | 1/1987 |
| JP | 62-1719 A | 1/1987 |
| JP | 6-345884 A * | 12/1994 |
| JP | 2000-212307 A | 8/2000 |
| JP | 2002-3699 A | 1/2002 |
| JP | 2003-2990 A * | 1/2003 |
| JP | 2003-201388 A | 7/2003 |
| JP | 2003-535181 A | 11/2003 |
| JP | 2004-269600 A | 9/2004 |
| JP | 2006-77202 A | 3/2006 |
| JP | 2007-130138 A | 5/2007 |
| JP | 2007-154160 A | 6/2007 |
| JP | 2008-7682 A | 1/2008 |
| JP | 2008-31193 A | 2/2008 |
| WO | WO-01/92415 A1 | 12/2001 |
| WO | WO-2006/077153 A2 | 7/2006 |
| WO | WO 2007/025007 A1 | 3/2007 |
| WO | WO 2008/001705 A1 | 1/2008 |

OTHER PUBLICATIONS

Kukdo bulletin for YD-128 Standard Liquid Epoxy Resin, Dec. 1, 2004, one page.*
Extended European Search Report, dated Dec. 23, 2011, for European Application No. 08752582.0.

* cited by examiner

*Primary Examiner* — Robert Sellers
(74) *Attorney, Agent, or Firm* — Birch, Stewart, Kolasch & Birch, LLP

(57) ABSTRACT

It is an object of the present invention to improve drawbacks in conventional technology and provide a fiber-reinforced composite material having both an excellent static strength property and impact resistance, and an epoxy resin composition for obtaining the fiber-reinforced composite material. More particularly, it is the object of the present invention to provide the epoxy resin composition that gives a cured material having a high elastic modulus, a high heat resistance, a high plastic deformation capacity and a high toughness.

The epoxy resin composition containing following [A] to [D], a prepreg obtained by impregnating a fiber substrate with the epoxy resin composition, a fiber-reinforced composite material obtained by curing the prepreg and a tubular body thereof.
[A] 10 to 60 parts by weight of an amine type epoxy resin,
[B] 40 to 90 parts by weight of a bisphenol-type epoxy resin,
[C] 1 to 10 parts by weight of dicyandiamide or a derivative thereof, and
[D] 1 to 10 parts by weight of at least one block copolymer selected from the group consisting of S-B-M, B-M and M-B-M.

12 Claims, No Drawings

EPOXY RESIN COMPOSITION, PREPREG, FIBER-REINFORCED COMPOSITE MATERIAL

TECHNICAL FIELD

The present invention relates to a fiber-reinforced composite material suitable for sporting uses and general industrial uses, a prepreg for obtaining this, and an epoxy resin composition suitably used as a matrix resin thereof.

BACKGROUND ART

Fiber-reinforced composite materials using carbon fibers and aramid fibers as reinforced fibers are widely utilized for structural materials of air planes and automobiles and for sporting uses such as tennis rackets, golf shafts and fishing rods and for general industrial uses by taking advantage of their high specific strength and specific elastic modulus. Employed methods for producing fiber-reinforce composite materials include: the method in which a prepreg, a sheet-shaped in-process material, impregnating reinforced fibers with an uncured matrix resin is prepared, and the prepregs are laminated multiply and thermally cured; and the resin transfer molding method in which a liquid resin is poured in the reinforced fibers disposed in a mold and thermally cured. Among these methods, the method using the prepreg has an advantage that the fiber-reinforced composite material having high performance is easily obtained because an orientation of the reinforced fibers can be strictly controlled and a design flexibility for a lamination structure is high. As a matrix resin used for this prepreg, thermosetting resins are mainly used in terms of heat resistance and productivity, and especially, epoxy resins are suitably used in terms of dynamic properties such as adhesiveness to the reinforced fibers.

In recent years, in addition to a trend toward weight lightening by substituting the fiber-reinforced composite materials for conventional materials such as metals, the trend toward further weight lightening of the fiber-reinforced composite material itself has been recently activated in various uses. In associated with that, it has become more popular to widely use the fiber-reinforced composite materials employing the reinforced fibers with higher elastic modulus. This allows the material to be thinned and lightened with keeping a rigidity of the material as it is. In this regard, however, when the reinforced fiber having the higher elastic modulus is used, a strength property such as fiber direction compression strength conversely tends to be reduced.

To improve the strength property such as fiber direction compressive strength (static strength property), it is effective that the elastic modulus of the matrix resin is enhanced. A combination of an amine-type epoxy resin component is an effective procedure that can enhance the elastic modulus while a harmful effect on the heat resistance and toughness of a cured matter is minimized. However, it has been a problem that impact strength is scarcely improved even in this case. For example, Patent Document 1 (JP Sho-62-1717-A) discloses that by combining the amine-type epoxy resin having the high elastic modulus, fiber direction bending strength and interlayer shearing strength, which are strongly correlated with the fiber direction compressive strength, were remarkably improved, but impact resistance was not sufficiently enhanced. Patent Document 2 (JP 2004-269600-A) discloses that a tubular body was obtained by combining carbon fibers having the high elastic modulus of which tensile elastic modulus is 375 GPa with the epoxy resin such as amine-type epoxy having the high elastic modulus, and it exerted high torsional strength, but the impact resistance was still insufficient.

In this regard, in order to increase the impact resistance of the fiber-reinforced composite material, which is composed of the reinforced fibers and the matrix, it is necessary to enhance the extension degree of the reinforced fiber and the extension degree and the toughness of the matrix resin. Among them, in particular, it has been described to be important and effective that the toughness of the matrix resin is enhanced, and it has been attempted to modify the epoxy resin.

Conventionally, as for methods to improve the toughness of an epoxy resin, some methods such as combining a rubber component or combining a thermoplastic resin have been attempted. However, these methods have had problems: deterioration of a process property due to reduction of the heat resistance and an increased viscosity; and quality reduction such as occurrence of voids.

Also, the method in which a fine phase separation structure is stably formed during curing the epoxy resin to largely enhance the toughness of the cured epoxy resin by adding a copolymer composed of styrene-butadiene-methyl methacrylate or a block copolymer such as a block copolymer composed of butadiene-methyl methacrylate has been proposed (Patent Document 3 and 4 [see JP 2003-535181, International Publication 2006/077153 Pamphlet]). However, because of excessively high crosslinking density in such a composition, plastic deformation capacity was insufficient, improvement for the enhancement by combining the block copolymer was not observed, and particularly when the reinforced fiber having the high elastic modulus was applied, the dynamic property of the resulting fiber-reinforced composite material was not sufficient. When dicyandiamide, which is a curing agent being suitable for prepreg molding that the fiber-reinforced composite material with high performance is easily obtained and giving the high plastic deformation capacity, was used in combination with the amine-type epoxy resin, the combined block copolymer formed a rough and large phase separation structure and the dynamic property tended not to be improved.

Patent Document 1: JP Sho-62-1717-A
Patent Document 2: JP 2004-269600-A
Patent Document 3: JP 2003-535181-A
Patent Document 4: International Publication 2006/077153 Pamphlet

DISCLOSURE OF INVENTION

Problem to be Solved by the Invention

It is an object of the present invention to improve the drawbacks in such conventional technologies and provide a fiber-reinforced composite material having both an excellent static strength property and impact resistance, and an epoxy resin composition for obtaining this. More particularly, it is the object of the present invention to provide the epoxy resin composition that gives a cured material having high elastic modulus, high heat resistance, high plastic deformation capacity and high toughness.

Means for Solving Problem

In order to solve the abovementioned problems, the epoxy resin composition of the present invention includes the following elements:

[1] An epoxy resin composition comprising [A] to [D]:

[A] 10 to 60 parts by weight of an amine-type epoxy resin;

[B] 40 to 90 parts by weight of a bisphenol-type epoxy resin;

[C] 1 to 10 parts by weight of dicyandiamide or a derivative thereof; and

[D] 1 to 10 parts by weight of at least one block copolymer selected from the group consisting of S-B-M, B-M and M-B-M, each block of S, B and M being linked by covalent bonding or being bound to one block through formation of one covalent bond and linked to another block via an intermediate molecule bound through formation of another covalent bond, the block M being a homopolymer of methyl methacrylate or a copolymer containing methyl methacrylate in an amount of at least 50% by weight, the block B being incompatible with epoxy resin and the block M and having a glass transition temperature Tg of 20° C. or below, and the block S being incompatible with epoxy resin, the block B and the block M and having a glass transition temperature Tg higher than the glass transition temperature Tg of the block B.

[2] The epoxy resin composition according to the [1], wherein the amine-type epoxy resin of the [A] has a reaction initiation temperature within a range of 130 to 150° C., measured in the case that stoichiometric one equivalent of dicyandiamide and 3 parts by weight of 3-(3,4-dichlorophenyl)-1,1-dimethylurea are blended to 100 parts by weight of the amine-type epoxy resin and temperature is raised at a temperature-rising speed of 10° C./minute.

[3] The epoxy resin composition according to the [1] or [2], wherein a bisphenol F-type epoxy resin occupies 20 to 90 parts by weight in the [B] 40 to 90 parts by weight of the bisphenol-type epoxy resin.

[4] The epoxy resin composition according to any one of the [1] to the [3], wherein the average epoxy equivalent in the bisphenol-type epoxy resin of the [B] is within a range of 300 to 800.

[5] The epoxy resin composition according to any one of the [1] to the [4], wherein the block B in the block copolymer of the [D] is poly 1,4-butadiene or poly(butyl acrylate).

[6] The epoxy resin composition according to the [1], wherein the size of the phase separation structure of the epoxy resin composition is within the range of 10 to 1000 nm when cured at 135° C. for 2 hours.

[7] The epoxy resin composition according to any one of the [1] to the [6], wherein the dicyandiamide or the derivative thereof of the [C] includes an active hydrogen group within a range of 0.6 to 0.9 equivalent to one equivalent of epoxy groups in a total epoxy resin component.

[8] A prepreg comprising a matrix composed of the epoxy resin composition according to any one of the [1] to the [7].

[9] A fiber-reinforced composite material obtained by laminating and curing the prepreg according to the [1] to the [8].

[10] A tubular body made from a fiber-reinforced composite material obtained by laminating and curing the prepreg according to any one of the [1] to the [8] into a tubular shape.

EFFECT OF THE INVENTION

According to the present invention, the epoxy resin composition that gives the cured material having the high elastic modulus, the high heat resistance, the high plastic deformation capacity and the high toughness can be obtained. The obtained fiber-reinforced composite material is excellent in both static strength property and impact resistance.

BEST MODES FOR CARRYING OUT THE INVENTION

The epoxy resin composition of the present invention has the desired high elastic modulus, as well as the high extension degree and the high toughness attributed to formation of a fine phase separation structure of [D] in a cured material, by comprising predetermined amounts of such [A] to [D] to be blended.

Epoxy resins and other components other than [A] to [D] may be contained within the range that the effects of the present invention are not lost.

In the epoxy resin composition of the present invention, it is necessary to contain the amine-type epoxy resin as [A] in the amount of 10 to 60 parts by weight in 100 parts by weight of the total epoxy resins, and the amount is preferably 20 to 50 parts by weight and more preferably 25 to 45 parts by weight in 100 parts by weight of the total epoxy resins. The amine-type epoxy resin is define as the epoxy resin having at least one or more amino groups binding at least two glycidyl groups in its molecule. By having such a structure, a crosslinked structure having a high crosslinking density is obtained when the resin is cured, and thus the property having the high heat resistance and the high elastic modulus is obtained. By combining [D] therewith, the elastic modulus of the cured material can be enhanced with keeping the heat resistance and the toughness. When the amount is less than 10 parts by weight, the enhancement of the elastic modulus of the cured material becomes insufficient and the strength property of the fiber-reinforced composite material is deficient. When the amount exceeds 60 parts by weight, the plastic deformation capacity of the cured material becomes insufficient and the impact resistance of the fiber-reinforced composite material is deficient.

As the amine-type epoxy resin, for example, tetraglycidyldiaminodiphenylmethane, triglycidylaminophenol, triglycidylaminocresol, diglycidylaniline, diglycidyltoluidine, tetraglycidylxylylenediamine, and halogen substituents, alkyl substituents and hydrogenated products thereof may be used.

As the tetraglycidyldiaminodiphenylmethane, "Sumiepoxy (registered trade name)" ELM434 (supplied from Sumitomo Chemical Co., Ltd.), YH434L (supplied from Tohto Kasei Co., Ltd.), "jER (registered trade name)" 604 (supplied from Japan Epoxy Resin Co., Ltd.), "Araldite (registered trade name)" MY720 and MY 721 (supplied from Huntsman Advanced Materials GmbH) may be used. As the triglycidylaminophenol or triglycidylaminocresol, "Sumiepoxy (registered trade name)" ELM100 and ELM120 (supplied from Sumitomo Chemical Co., Ltd.), "Araldite (registered trade name)" MY0500, MY0510 and MY0600 (supplied from Huntsman Advanced Materials GmbH), and "jER (registered trade name)" 630 (supplied from Japan Epoxy Resin Co., Ltd.) may be used. As the diglycidylaniline, GAN (supplied from Nippon Kayaku Co., Ltd.) may be used. As to the diglycidyltoluidine, GOT (supplied from Nippon Kayaku Co., Ltd.) may be used. As the tetraglycidylxylylenediamine and hydrogenated products thereof, "TETRAD (registered trade name)"-X and "TETRAD (registered trade name)"-C (supplied from Mitsubishi Gas Chemical Co., Inc.) may be used.

As the amine-type epoxy resin of the [A] in the present invention, it is desirable that a reaction initiation temperature ($T_0$) measured using a differential scanning calorimeter (DSC) is preferably within the range of 130 to 150° C. and more preferably 135 to 145° C. Here, $T_0$ is an exothermic onset temperature measured in the case that stoichiometric one equivalent of dicyandiamide (hereinafter sometimes abbreviated as DICY), which is a curing agent, and 3 parts by weight of 3-(3,4-dichlorophenyl)-1,1-dimethylurea (DCMU), which is a curing accelerator, are blended with 100 parts by weight of the epoxy resin, and temperature thereof is raised at a temperature-rising speed of 10° C./minute. Here, when the amount of dicyandiamide to be added is calculated, the calculation is performed using an active hydrogen equivalent of 12 g/eq.

The exothermic onset temperature is referred to as a temperature at which a DSC curve separates from the baseline, worked out from the temperature at which a tangent line to the DSC curve reaches the 1/10 slope of the slope of the tangent line to an inflection point on a side of the positive slope in a curing exothermic peak. Although a detailed mechanism is unknown, by containing the amine-type epoxy resin having $T_0$ within such a range, compatibility of the block copolymer of the [D] is enhanced, and a phase separation size (size of phase separation structure) of the block copolymer of the [D] becomes finer in the cured material, and the impact resistance of the fiber-reinforced composite material is further enhanced. When the $T_0$ is lower than 130° C., the phase separation tends to enlarge, and the toughness and the plastic deformation capacity of the cured material and the impact resistance of the fiber-reinforced composite material are deficient in some cases. When the $T_0$ exceeds 150° C., a curing reaction becomes incomplete in some cases and the fragile fiber-reinforced composite material is made in some cases.

In the present invention, it is necessary to contain the bisphenol-type epoxy resin as [B] in the amount of 40 to 90 parts by weight in 100 parts by weight of the total epoxy resins, and it is desirable to contain preferably 50 to 80 parts by weight and more preferably 55 to 75 parts by weight. When the amount is less than 40 parts by weight, the compatibility of the [D] becomes insufficient, the [D] forms the rough and large phase separation in the cured material, and the impact resistance of the fiber-reinforced composite material is deficient. When the amount exceeds 90 parts by weight, the elastic modulus of the cured material becomes insufficient and the strength property of the fiber-reinforced composite material is deficient. Here, the bisphenol-type epoxy resin is a bisphenol compound in which two phenolic hydroxyl groups are glycidylated.

The [B] in the present invention is not particularly limited as long as the [B] is the bisphenol-type epoxy resin. A bisphenol A-type, a bisphenol F-type, a bisphenol AD-type, and a bisphenol S-type, or halogen substituents, alkyl substituents and hydrogenated products thereof may be used. The bisphenol-type epoxy resins are not limited to monomer compounds, polymers having multiple repeating units may be suitably used.

Commercially available bisphenol A-type epoxy resins may include jER825, jER828, jER834, jER1001, jER1002, jER1003, jER1004, jER1004AF, jER1005F, jER1006FS, jER1007 and jER1009 (supplied from Japan Epoxy Resin Co., Ltd., "jER" is the registered trade name of the same company). Brominated bisphenol A-type epoxy resins may include jER5050, jER5054 and jER5057 (supplied from Japan Epoxy Resin Co., Ltd.).

Commercially available bisphenol F-type epoxy resins may include jER806, jER807, jER4002P, jER4004P, jER4007P and jER4009P (supplied from Japan Epoxy Resin Co., Ltd.), and Epotohto YDF2001 and Epotohto YDF2004 (supplied from Tohto Kasei Co., Ltd., "Epotohto" is the registered trade name of the same company). Tetramethylbisphenol F-type epoxy resins may include YSLV-80XY (supplied from Nippon Steel Chemical Co., Ltd.).

Bisphenol S-type epoxy resins may include "Epiclon (registered trade name)" EXA-1514 (supplied from Dainippon Ink And Chemicals, Inc.).

As the [B] in the present invention, it is desirable that the bisphenol F-type epoxy resin occupies 20 to 90 parts by weight in the amount of 40 to 90 parts by weight of the bisphenol-type epoxy resins (50 to 100% by weight of the bisphenol F-type epoxy resins in the amount of 40 to 90 parts by weight of bisphenol-type epoxy resins), preferably 28 to 90 parts by weight (70 to 100% by weight in the same) and more preferably 36 to 90 parts by weight (90 to 100% by weight in the same). This can largely enhance the elastic modulus by a synergistic effect with the amine-type epoxy resin. When the amount is less than 20 parts by weight (50% by weight in the same), the elastic modulus of the cured material is insufficiently enhanced and the strength property of the fiber-reinforced composite material is deficient in some cases.

As the bisphenol-type epoxy resin of the [B] in the present invention, an average epoxy equivalent is preferably in the range of 300 to 800, more preferably 350 to 700 and still more preferably 400 to 600. When the average epoxy equivalent is less than 300, the block copolymer of the [D] forms the rough and large phase separation and the impact resistance of the fiber-reinforced composite material is deficient in some cases. When the average epoxy equivalent exceeds 800, the heat resistance of the fiber-reinforced composite material is deficient in some cases. Such average epoxy equivalent can be obtained, for example, by a publicly known titration test as shown in JIS K7236 (1995), and when the multiple epoxy resins having the known epoxy equivalent are combined, the average epoxy equivalent can be estimated as follows. The calculation method is described by using the case of combining three types of the epoxy resins as an example. When Wx parts by weight of epoxy resin X having the epoxy equivalent of Ex(g/eq), Wy parts by weight of epoxy resin Y having the epoxy equivalent of Ey(g/eq) and Wz parts by weight of epoxy resin Z having the epoxy equivalent of Ez(g/eq) are blended, their average epoxy equivalent is obtained by the following calculation formula.

$$\text{Average epoxy equivalent} = (Wx+Wy+Wz)/(Wx/Ex+Wy/Ey+Wz/Ez)$$

Dicyandiamide or a derivative thereof as the [C] in the present invention is the essential component to cure the epoxy resin. The dicyandiamide derivative is one obtained by binding various types of compound to dicyandiamide, and may include a reactant with the epoxy resin, a reactant with a vinyl compound and an acrylic compound.

The amount of dicyandiamide or the derivative thereof to be blended as the [C] is necessary to be 1 to 10 parts by weight and is preferably 2 to 8 parts by weight to 100 parts by weight of the epoxy resin in the epoxy resin composition in terms of heat resistance and dynamic property. When the amount is less than 1 part by weight, the plastic deformation capacity of the cured material is deficient, and the impact resistance of the fiber-reinforced composite material is deficient. When the amount exceeds 10 parts by weight, the [D] forms the rough and large phase separation and the impact resistance of the fiber-reinforced composite material is deficient. Blending the dicyandiamide or the derivative thereof of the [C] as powder into the resin is preferable in terms of storage stability at room temperature and viscosity stability upon making the prepreg. When the [C] is blended as powder to the resin, an average particle diameter of the [C] is preferably 10 μm or less and more preferably 7 μm or less. When the average particle diameter exceeds 10 μm, for example in the case of use for the prepreg, when reinforced fiber bundles is impregnated with the resin composition with heating and pressure, the [C] is not infiltrated in the reinforced fiber bundles and stranded on a surface layer of the fiber bundles in some cases.

It is also preferable that dicyandiamide or the derivative thereof of the [C] is contained in the amount that an active hydrogen group is within the range of 0.6 to 0.9 equivalent to one equivalent of epoxy groups in the total epoxy resin component. Here, the active hydrogen group means a functional group in the dicyandiamide or the derivative thereof of the [C], which is capable of being reacted with the epoxy group. When the amount of the active hydrogen group is less than 0.6 equivalent, the heat resistance of the cured material or the fiber-reinforced composite material is deficient in some cases. When the amount of the active hydrogen group exceeds 0.9 equivalent, the heat resistance is sufficient, but the plastic deformation capacity is deficient and a water absorption rate also becomes high in the cured material; thus, the impact resistance of the fiber-reinforced composite material is deficient and the water absorption rate of the fiber-reinforced composite material becomes high in some cases.

Commercially available dicyandiamide may include DICY7 and DICY15 (supplied from Japan Epoxy Resin Co., Ltd.).

Dicyandiamide or the derivative thereof may be used alone or in combination with the other curing agent of epoxy resin or a curing catalyst of dicyandiamide. The curing agent of the epoxy resin to be combined may include aromatic amine curing agents, alicyclic amine curing agents and acid anhydride curing agents. The curing catalyst of dicyandiamide to be combined may include urea compounds, imidazole compounds and Lewis acid catalysts, and among them, the urea compound is preferable, and the amount to be blended is preferably 1 to 2.5 parts by weight based on 100 parts by weight of the entire epoxy resins. When the amount of the urea compound is less than 1.0 part by weight, the reaction does not progress sufficiently, the elastic modulus and the heat resistance of the cured material are deficient, and the strength and the heat resistance of the fiber-reinforced composite material are deficient in some cases. When the amount thereof exceeds 2.5 parts by weight, the plastic deformation capacity is deficient and the water absorption rate is increased in the cured material, and the impact resistance is deficient and the water absorption rate is increased in the fiber-reinforced composite material in some cases. Commercially available urea compounds may include DCMU99 (supplied from Hodogaya Chemical Co., Ltd.), and Omicure 24, Omicure 52 and Omicure 94 (supplied from CVC Specialty Chemicals, Inc.). Commercially available imidazole compounds may include 2MZ, 2PZ and 2E4MZ (supplied from Shikoku Chemicals Corporation). The Lewis acid catalysts may include complexes of halogenated boron and a base such as halogenated boron includes a boron trifluoride/piperidine complex, a boron trifluoride/monoethylamine complex, a boron trifluoride/triethanolamine complex and a boron trichloride/octylamine complex.

The block copolymer of the [D] in the present invention, which is at least one selected from the group consisting of S-B-M, B-M and M-B-M (hereinafter occasionally abbreviated as the block copolymer), is the block copolymer previously disclosed in the Patent Document 3 (JP 2003-535181) or the above Patent Document 4 (International Publication 2006/077153 Pamphlet), and it is an essential component for enhancing the toughness of the cured material and the impact resistance of the fiber-reinforced composite material with keeping the excellent heat resistance of the epoxy resin composition.

Here, each of blocks represented by S, B and M is linked by covalent bonds, or linked by the covalent bonds through some sort of chemical structures.

The block M is a homopolymer of polymethyl methacrylate or a copolymer containing methyl methacrylate in the amount of at least 50% by weight.

The block B is incompatible with epoxy resin (this epoxy resin means the [A] and the [B] as well as the other epoxy resins that may be contained in the epoxy resin composition of the present invention) and the block M, and has a glass transition temperature Tg (hereinafter occasionally represented by Tg alone) of 20° C. or below.

The glass transition temperature Tg of the block B can be measured by DMA method using RSAII (supplied from Rheometrics) when either the epoxy resin composition or the block copolymer alone is used. That is, when a traction cycle at 1 Hz is given to a platy sample of 1×2.5×34 mm at temperature of 50 to 250° C., a maximum tan δ value is employed as the glass transition temperature Tg. Here, the sample is prepared as follows. When the epoxy resin composition is used, a platy cured material with no void is obtained by defoaming the uncured resin composition in vacuum, and subsequently curing the resin composition in a mold set to make a thickness 1 mm by a spacer having the thickness of 1 mm and made from "Teflon (registered trade name)" at 130° C. for 2 hours. When the block copolymer is used alone, a plate with no void is likewise obtained using a biaxial extruder. These are cut out into the above size by using a diamond cutter and then can be applied to evaluation.

The block S is incompatible with the epoxy resin, the blocks B and M, and has the glass transition temperature Tg that is higher than that of the block B.

It is preferable in terms of enhancing the toughness of the cured material that any of the blocks of S, B and M when the block copolymer is S-B-M, or any of the blocks of B and M when the block copolymer is B-M or M-B-M, is compatible with the epoxy resins (this epoxy resin means [A] and [B] as well as the other epoxy resin that may be contained in the epoxy resin composition of the present invention).

It is necessary that the amount of the block copolymer of the [D] to be blended is 1 to 10 parts by weight and it is desirable that the amount thereof is within the range of preferably 2 to 7 parts by weight and more preferably 3 to 6 parts by weight based on 100 parts by weight of the epoxy resins in the epoxy resin composition, in terms of dynamic property and congeniality to a process of producing the composite. When the amount is less than 1 part by weight, the toughness and the plastic deformation capacity of the cured material are deficient, and the impact resistance of the fiber-reinforced composite material becomes insufficient. When the amount exceeds 10 parts by weight, the elastic modulus of the cured material is remarkably reduced, and the static strength property of the fiber-reinforced composite material becomes insufficient; moreover, a resin flow at molding temperature is deficient, obtaining the fiber-reinforced composite material including voids.

In terms of compatibility with the epoxy resin and control of various properties in the cured material, it is suitably performed to introduce the monomer other than methyl methacrylate as a copolymerization component into the block M. Such copolymerization component of the monomer is not particularly limited, and may be appropriately selected from the above viewpoints, but generally the monomer having a high polarity, particularly the water-soluble monomer is suitably used in order to obtain the compatibility with the epoxy resin having high polarity. Among them, an acrylamide derivative is preferably used, and acrylic based-monomers are not particularly limited to dimethylacrylamide, but other reactive monomers can be applied.

The reactive monomer here means a monomer having the functional group that can react with an oxirane group in the epoxy molecule or the functional group in the curing agent. Specific examples thereof may include reactive functional groups such as oxirane group, amine group or carboxyl group, but are not limited thereto. The reactive monomer to be employed may be (meth)acrylic acid (methacrylic acid and acrylic acid are collectively represented by (meth)acrylic acid) or any other monomers hydrolyzable in this acid. The reactive monomer is preferably used because the use of the reactive monomer improves the compatibility with the epoxy resin and the adhesiveness in an interface of the epoxy-block copolymer.

The example of the other monomer that can compose the block M may include glycidyl methacrylate or tert-butyl methacrylate, and it is preferable that at least 60% of the block M is composed of syndiotactic PMMA (polymethyl methacrylate).

The glass transition temperature Tg of the block B is 20° C. or below, preferably 0° C. or below and more preferably −40° C. or below. The lower such a glass transition temperature Tg is, the more preferable it is in terms of toughness in the cured material. However, when the glass transition temperature is lower than −100° C., the problem occurs in workability in some cases; for example, a cut face is roughened when the fiber-reinforced composite material is made.

The block B is preferably an elastomer block. The monomer used for synthesizing the elastomer block may be any dienes selected from butadiene, isoprene, 2,3-dimethyl-1,3-butadiene, 1,3-pentadiene and 2-phenyl-1,3-butadiene.

It is preferable in terms of toughness in the cured material that this block B is selected from polydiene, particularly polybutadiene, polyisoprene and random copolymers thereof, or partially or completely hydrogenated polydienes. Polybutadiene may include 1,2-polybutadiene (Tg: about 0° C.), but more preferably 1,4-polybutadiene having the lowest glass transition temperature Tg (Tg: about −90° C.) is used. This is because the use of the block B having the lower glass transition temperature Tg is advantageous in terms of impact resistance of the fiber-reinforced composite material and toughness of the cured material. The block B may be hydrogenated. This hydrogenation is performed according to an ordinary method.

It is also preferable that alkyl (meth)acrylate is used as the monomer for synthesizing the elastomer block B. Specific examples thereof may include ethyl acrylate (−24° C.), butyl acrylate (−54° C.), 2-ethylhexyl acrylate (−85° C.), hydroxyethyl acrylate (−15° C.) and 2-ethylhexyl methacrylate (−10° C.). Here, a numeral shown in a parenthesis after the name of each acrylate indicates Tg of the block B when each acrylate is used. Among them, it is preferable to use butyl acrylate. Acrylate as the monomer which synthesizes the block B is incompatible with the acrylate of the block M containing methyl methacrylate in the amount of at least 50% by weight. Among them, it is preferable that the block B is mainly composed of 1,4-polydiene, or polybutyl acrylate and poly (2-ethylhexyl acrylate).

When the triblock copolymer S-B-M is used as the block copolymer of the [D] in the present invention, the block S is incompatible with the blocks B and M, and its glass transition temperature Tg of the block S is higher than that of the block B. Tg or a melting point of the block S is preferably 23° C. or above and more preferably 50° C. or above. In the present invention, the glass transition temperature Tg of the block S is measured in the same manner as in the case of Tg in the block B. Examples of the block S may include those obtained from aromatic vinyl compounds such as styrene, α-methylstyrene or vinyl toluene, and those obtained from alkyl ester of acrylic acid and/or methacrylic acid having an alkyl chain of 1 to 18 carbon atoms. The latter one obtained from alkyl ester of acrylic acid and/or methacrylic acid having the alkyl chain of 1 to 18 carbon atoms is mutually incompatible with the block M containing methyl methacrylate in the amount of at least 50% by weight.

When the triblock copolymer M-B-M is used as the block copolymer of the [D] in the present invention, two of the block M in the triblock copolymer M-B-M may be the same or different. They can be derived from the same monomer, but different in molecular weight.

When the triblock copolymer M-B-M and the diblock copolymer B-M are combined as the block copolymer of the [D] in the present invention, the block M of the triblock copolymer M-B-M and the block M of the diblock copolymer B-M may be the same or different. The block B of the triblock M-B-M may be the same as or different from the block B of the diblock copolymer B-M.

When the triblock copolymer S-B-M and the diblock copolymer B-M and/or the triblock copolymer M-B-M are combined as the [D] block copolymer in the present invention, the block M of the triblock copolymer S-B-M, each Block M of the triblock copolymer M-B-M and the block M of the diblock copolymer B-M may be mutually the same or different. The respective blocks B of triblock copolymer S-B-M, the triblock copolymer M-B-M and the diblock copolymer B-M may be mutually the same or different.

The block copolymers used as the materials in the present invention can be produced by anion polymerization, and can be produced by the methods described in, for example, European Patent EP 524,054 and European Patent EP 749,987.

Specific examples of the triblock copolymer M-B-M may include "Nanostrength (registered trade name)" M22 and "Nanostrength (registered trade name)" M22N having a polar functional group supplied from Arkema as the copolymer composed of methyl methacrylate-butyl acrylate-methyl methacrylate. Specific examples of the triblock copolymer S-B-M may include "Nanostrength (registered trade name)" 123, "Nanostrength (registered trade name)" 250, "Nanostrength (registered trade name)" 012, "Nanostrength (registered trade name)" E20 and "Nanostrength (registered trade name)" E40 supplied from Arkema as the copolymer composed of styrene-butadiene-methyl methacrylate.

The epoxy resin other than [A] and [B] may be added to the epoxy resin composition of the present invention for the purpose of adjusting a viscoelasticity in the uncured composition to improve a working property and enhancing the elastic modulus and the heat resistance of the cured material. The epoxy resin may be added alone or in combination of multiple types. Specific examples include phenol novolak-type epoxy resins, cresol novolak-type epoxy resins, resorcinol-type epoxy resins, phenol aralkyl-type epoxy resins, dicyclopentadiene-type epoxy resins, epoxy resins having a biphenyl skeleton, urethane-modified epoxy resins and isocyanate-modified epoxy resins.

Commercially available products of the phenol novolak-type epoxy resin may include "Epicoat (registered trade name)" 152, "Epicoat (registered trade name)" 154 (supplied from Japan Epoxy Resin Co., Ltd.), "Epiclon (registered trade name)" N-740, "Epiclon (registered trade name)" N-770 and "Epiclon (registered trade name)" N-775 (supplied from Dainippon Ink And Chemicals, Inc.).

Commercially available products of the cresol novolak-type epoxy resin may include "Epiclon (registered trade name)" N-660, "Epiclon (registered trade name)" N-665, "Epiclon (registered trade name)" N-670, "Epiclon (registered trade name)" N-673 and "Epiclon (registered trade name)" N695 (supplied from Dainippon Ink And Chemicals, Inc.), EOCN-1020, EOCN-102S and EOCN-104S (supplied from Nippon Kayaku Co., Ltd.).

Specific examples of the resorcinol-type epoxy resin include "Denacol (registered trade name)" EX-201 (supplied from Nagase ChemteX Corporation).

Commercially available products of the dicyclopentadiene-type epoxy resin may include "Epiclon (registered trade name)" HP7200, "Epiclon (registered trade name)" HP7200L and "Epiclon (registered trade name)" HP7200H (supplied from Dainippon Ink And Chemicals, Inc.), Tactix558 (supplied from Huntsman Advanced Materials GmbH), and XD-1000-1L and XD-1000-2L (supplied from Nippon Kayaku Co., Ltd.).

Commercially available products of the epoxy resins having the biphenyl skeleton may include "Epicoat (registered trade name)" YX4000H, "Epicoat (registered trade name)" YX4000 and "Epicoat (registered trade name)" YL6616 (supplied from Japan Epoxy resin Co., Ltd.), and NC-3000 (supplied from Nippon Kayaku Co., Ltd.).

Commercially available products of the urethane-modified and isocyanate-modified epoxy resins may include AER4152 (supplied from Asahi Kasei Epoxy Co., Ltd.) and ACR1348 (supplied from Asahi Denko Co., Ltd.) having an oxazolidone ring.

A thermoplastic resin soluble in the epoxy resin, organic particles such as rubber particles and thermoplastic resin particles, and inorganic particles may be blended into the epoxy resin composition of the present invention in order to control viscoelasticity to improve a tack property and a drape property of the prepreg and improve the dynamic property such as impact resistance of the fiber-reinforced composite material.

As the thermoplastic resin soluble in the epoxy resin, the thermoplastic resin having a hydrogen-bonding functional group, which an improvement of the adhesiveness between the resin and the reinforced fiber is anticipated, is preferably used.

The hydrogen-bonding functional group may include an alcoholic hydroxyl group, an amide bond group and a sulfonyl group.

The thermoplastic resin having the alcoholic hydroxyl group includes polyvinyl acetal resins such as polyvinyl formal and polyvinyl butyral, polyvinyl alcohol resin and phenoxy resin. The thermoplastic resin having the amide bond includes polyamide resin, polyimide resin and polyvinyl pyrrolidone resin. The thermoplastic resin having the sulfonyl group includes polysulfone resin. Polyamide, polyimide and polysulfone may have the functional group such as an ether bond and a carbonyl group in their main chains. Polyamide may have a substituent on a nitrogen atom of its amide group.

Commercially available products of the thermoplastic resin that is soluble in the epoxy resin and has the hydrogen-bonding functional group include Denka Butyral and "Denka Formal (registered trade name)" (supplied from Denki Kagaku Kogyo K.K.), and "Vinylec (registered trade name)" (supplied from Chisso Corporation) as the polyvinyl acetal resin; "UCAR (registered trade name)" PKHP (supplied from Union Carbide Corporation) as the phenoxy resin; "Macromelt (registered trade name)" (supplied from Henkel Hakusui Corporation) and "Amiran (registered trade name)" CM4000 (supplied from Toray Industries, Inc.) as the polyamide resin; "Ultem (registered trade name)" (supplied from General Electric Corporation) and "Matrimid (registered trade name)" 5218 (supplied from Ciba Geigy Corporation) as polyimide; "Victrex (registered trade name)" (supplied from Mitsui Chemicals Inc.) and "UDEL (registered trade name)" (supplied from Union Carbide Corporation) as polysulfone; and "Luviscol (registered trade name)" (supplied from BASF Japan) as polyvinyl pyrrolidone.

The acrylic resin is highly compatible with the epoxy resin, and is suitably used for controlling the viscoelasticity. Examples of the commercially available acrylic resins may include "Dianal (registered trade name)" BR series (supplied from Mitsubishi Rayon Co., Ltd.) and "Matsumoto Microsphere (registered trade name)" M, M100 and M500 (supplied from Matsumoto Yushi Seiyaku Co., Ltd.).

As the rubber particles, crosslinked rubber particles and core shell rubber particles obtained by graft-polymerizing a dissimilar polymer on the surface of the crosslinked rubber particles are preferably used in terms of handling.

As the commercially available products of the crosslinked rubber particles, FX501P composed of a crosslinked copolymer of carboxyl-modified butadiene-acrylonitrile (supplied from Japan Synthetic Rubber Co., Ltd.), CX-MN series (supplied from Nippon Shokubai Co., Ltd.) and YR-500 series (supplied from Tohto Kasei Co., Ltd.) composed of acrylic rubber fine particles may be used.

As the commercially available products of the core shell rubber particles, for example, "Paraloid (registered trade name)" EXL-2655 composed of the copolymer of butadiene/alkyl methacrylate/styrene (supplied from Kureha Corporation), "Stafiloid (registered trade name)" AC-3355, TR-2122 composed of the copolymer of acrylate ester/methacrylate ester (supplied from Takeda Chemical Industries, Ltd.), "Paraloid (registered trade name)" EXL-2611 and EXL-3387 (supplied from Rohm & Haas), and Kane-Ace (registered trade name)" MX series (supplied from Kaneka Corporation) composed of the copolymer of butyl acrylate/methyl methacrylate may be used.

As to the thermoplastic resin particles, polyamide particles and polyimide particles are preferably used, and SP-500 (supplied from Toray Industries, Inc.) and "Orgasol (registered trade name)" (supplied from Arkema) may be used as the commercially available products of the polyamide particles.

In the present invention, the organic particles such as rubber particles and thermoplastic resin particles are blended preferably in the amount of 0.1 to 30 parts by weight and more preferably 1 to 15 parts by weight to 100 parts by weight of the entire epoxy resins in terms of balancing the elastic modulus and the toughness in the resulting cured material.

A kneader, a planetary mixer, a three roll extruder and a biaxial extruder are preferably used for preparing the epoxy resin composition of the present invention. The block copolymer of the [D] is added to the epoxy resin, kneaded, and subsequently the temperature of the composition is raised up to any temperature at 130 to 180° C. with stirring, and then the block copolymer of the [D] is dissolved in the epoxy resin with stirring at that temperature. The method, in which after the block copolymer of the [D] is dissolved in the epoxy resin to obtain the transparent and viscous solution, the temperature is lowered to preferably 100° C. or below and more preferably 80° C. or below with stirring to add and knead dicyandiamide or the derivative thereof of the [C] and the curing catalyst, is preferably employed, because the rough and large separation of the block copolymer hardly occurs and the storage stability of the resin composition is excellent.

When the epoxy resin composition of the present invention is used as the matrix resin for the prepreg, it is desirable in terms of process properties such as tack and drape that the viscosity at 80° C. is in the range of preferably 0.1 to 200 Pa·s, more preferably 0.5 to 100 Pa·s and still more preferably 1 to 50 Pa·s. When the viscosity less than 0.1 Pa·s, a shape keeping ability of the prepreg becomes insufficient and cracks occur in some cases, and additionally the resin flow often occurs upon being molded, and a fiber content varies in some cases. When the viscosity exceeds 200 Pa·s, blurs occur in a step of forming the resin composition into a film, and non-impregnated portions occur in a step of impregnating to the reinforced fiber in some cases. The viscosity referred to as here indicates complex viscoelasticity $\eta^*$ worked out using a dynamic viscoelasticity measurement apparatus (Rheometer RDA 2 supplied Rheometrics; ARES supplied from TA Instruments) and a parallel plate having a diameter of 40 mm, and measuring at frequency of 0.5 Hz at gap of 1 mm with simply raising the temperature at 2° C./minute.

It is desirable that the toughness ($K_{IC}$) of the cured material obtained by curing the epoxy resin composition of the present invention at 130° C. for 2 hours is preferably within the range of 1.0 to 2.8 MPa·cm$^{-0.5}$, more preferably 1.2 to 2.8 MPa·cm$^{-0.5}$, and moreover preferably 1.4 to 2.8 MPa·cm$^{-0.5}$. When $K_{IC}$ is less than 1.0, the impact resistance of the fiber-reinforced composite material is deficient in some cases. When $K_{IC}$ exceeds 2.8, the working property of a cutting processing is deteriorated in some cases when the fiber-reinforced composite material is made.

It is desirable that the glass transition temperature Tg of the cured material obtained by curing the epoxy resin composition of the present invention at 130° C. for 2 hours is preferably 115° C. or above, and more preferably 120° C. or above. When the glass transition temperature is lower than the above temperature, the heat resistance of the cured material is deficient, and a warp and a strain occur upon molding the composite or in use of the composite in some cases. An upper limit of the heat resistance is generally 150° C. or below because the plastic deformation capacity and the toughness tend to be reduced when the heat resistance of the cured material is increased.

It is desirable that bending elastic modulus of the cured material obtained by curing the epoxy resin composition of the present invention at 130° C. for 2 hours is preferably 3.6 GPa or more and more preferably 3.8 GPa or more. Bending flexure amount that is an indicator of the extension degree of the epoxy resin composition is preferably 7 mm or more and more preferably 10 mm or more. When either the bending elastic modulus or the bending flexure amount is lower than the above range, the cured material is inferior in plastic deformation capacity in some cases. The upper limits of the bending elastic modulus and the bending flexure amount are 5.0 GPa or less and 20 mm or less, respectively.

In the epoxy resin composition of the present invention, the phase separation of the block copolymer of the [D] occurs in its curing process, forming a fine alloy structure. Accurately, the fine alloy structure is formed by the phase separation of the block that is low compatible with the epoxy resin among the multiple blocks in the block copolymer of the [D] during the curing. It is preferable to form the phase separation structure having the size within the range of 10 to 1000 nm when the epoxy resin composition of the present invention is cured at 130° C. for 2 hours. Here, the size of the phase separation structure (hereinafter described as the phase separation size) is a number average value of the sizes of island phases in the case of the sea-island structure. When the island phase has an elliptic shape, the major axis is employed. When the island phase is amorphous, the diameter of a circumscribed circle is used. When the island phase exhibits two or more layered circles or ellipses, the diameter of the circle or the major axis of the ellipse in the outmost layer is used. In the case of the sea-island structure, the major axes of all island phases present in the predetermined region are measured, and the number average value of them is determined as the phase separation size. The predetermined region is set as follows based on a micrograph. It is referred to as the region obtained by taking the micrograph at a magnification of 20,000 times and randomly selecting three regions having a square of 4 mm on the micrograph (region of the square of 200 nm on the sample) when the phase separation size is predicted to be a 10 nm order (10 nm or more and less than 100 nm). Likewise, it is referred to as the region obtained by taking the micrograph at a magnification of 2,000 times and randomly selecting three regions having the square of 4 mm on the micrograph (region of the square of 2 μm on the sample) when the phase separation size is predicted to be a 100 nm order (100 nm or more and less than 1000 nm). It is referred to as the region obtained by taking the micrograph at a magnification of 200 times and randomly selecting three regions having the square of 4 mm on the micrograph (region of the square of 20 μm on the sample) when the phase separation size is predicted to be a 1 μm order (1 μm or more and less than 10 μm). If the measured phase separation size is out of the predicted order, the region corresponding to the order is measured again at the corresponding magnification, and this result is employed. In the case of a continuous two-phase structure, a straight line having a predetermined length is drawn on the micrograph, an intersecting point of the straight line and a phase interface is picked up, a distance between the adjacent intersecting points is measured, and the number average value of them is employed as the phase separation size. The predetermined length is set as follows based on the micrograph. It is referred to as the length obtained by taking the micrograph at a magnification of 20,000 times and randomly selecting three lines having the length of 20 mm on the micrograph (length of 1000 nm on the sample) when the phase separation size is predicted to be the 10 nm order (10 nm or more and less than 100 nm). Likewise, it is referred to as the length obtained by taking the micrograph at a magnification of 2,000 times and randomly selecting three lines having the length of 20 mm on the micrograph (length of 10 μm on the sample) when the phase separation size is predicted to be the 100 nm order (100 nm or more and less than 1000 nm). It is referred to as the length obtained by taking the micrograph at a magnification of 200 times and randomly selecting three lines having the length of 20 mm on the micrograph (length of 100 μm on the sample) when the phase separation size is predicted to be the 1 μm order (1 μm or more and less than 10 μm). If the measured phase separation size is out of the predicted order, the length corresponding to the order is measured again at the corresponding magnification, and this result is employed. Upon measuring on the micrograph, the size of 0.1 mm or more is determined as the island phase and measured. It is desirable that the phase separation size is preferably within the range of 10 to 500 nm, more preferably 10 to 200 nm and particularly preferably 15 to 100 nm. When the phase separation size is less than 10 nm, the toughness of the cured material is deficient and the impact resistance of the fiber-reinforced composite material is deficient in some cases. When the phase separation is the rough and large phase separation having the phase separation size of more than 1000 nm, the plastic deformation capacity and the toughness of the cured material are deficient and the impact resistance of the fiber-reinforced composite material is deficient in some cases. This phase separation can be observed by observing a cross section of the cured resin material by using a scanning electron microscope or a transmission electron microscope. The cross section may be stained with osmium if necessary, and the staining is carried out by the ordinary method.

Water absorption rate when the cured material obtained by curing the epoxy resin composition of the present invention at 130° C. for 2 hours is immersed in boiling water for 360 hours is preferably 6% by weight or less. Generally, when the water absorption rate of the cured material is increased, the plastic deformation capacity of the cured material absorbing the water tends to be reduced, and the strength property of the fiber-reinforced composite material absorbing the water tends to be reduced. The water absorption rate of the cured material obtained by curing the resin composition composed of the amine-type epoxy resin tends to become higher than the water absorption rate of the cured material obtained by curing the resin composition composed of the bisphenol-type epoxy resin.

The reinforced fiber used in the present invention is not particularly limited, glass fibers, carbon fibers, aramid fibers, boron fibers, alumina fibers and silicon carbide fibers may be used. These fibers may be used in mixture of two or more. Among them, it is preferable to use the carbon fiber from which the light and highly rigid fiber-reinforced composite material is obtained. Among them, it is desirable that the carbon fiber has tensile elastic modulus of preferably 280 to 800 GPa and more preferably 380 to 800 GPa. When such the carbon fiber having the high elastic modules is combined with the epoxy resin composition of the present invention, the effects of the present invention tend to appear particularly remarkably.

A form of the reinforced fiber is not particularly limited, and for example, continuous fibers sorted in one direction, tows, fabrics, mats, nits, laces and short fibers chopped into the length of less than 10 mm may be used. The continuous fiber referred to as here indicates a single fiber or a fiber bundle that is substantially continuous for 10 mm or longer. The short fiber referred to as here is the fiber bundle cut into the length of less than 10 mm. For intended uses that require a high specific strength and high specific elastic modulus, an arrangement in which reinforced fiber bundles are sorted in a single direction is the most suitable; however, a cloth-shaped (fabric) arrangement that is easily handled is also suitable for the present invention.

The prepreg of the present invention is a product obtained by impregnating a fiber substrate with the epoxy resin composition of the present invention. The method of impregnation may include a wet method in which the epoxy resin composition is dissolved in the solvent such as methyl ethyl ketone or methanol to reduce its viscosity and impregnate, and a hot melt method (dry method) in which the viscosity is reduced by heating and the composition is impregnated.

The wet method is the method in which the reinforced fibers are immersed in the solution of the epoxy resin composition, then drawn up and the solvent is evaporated using an oven. The hot melt method is the method in which the epoxy resin composition whose viscosity is reduced by heating is directly impregnated in the reinforced fibers, or the method in which a film obtained by coating the epoxy resin composition on a mold releasing paper is made, then the film is overlapped from both sides or one side of the reinforced fibers, which is then heated and pressurized to impregnate the reinforced fibers with the resin. The hot melt method is preferable because the prepreg is substantially free from the residual solvent according to this method.

It is preferable that the prepreg contains the reinforced fibers in the amount of 70 to 2000 g/m² per unit area. When the amount of the reinforced fibers is less than 70 g/m², it is necessary to laminate with many layers in order to obtain a predesigned thickness upon forming the fiber-reinforced composite material, and the work becomes sometimes complicated. Meanwhile, when the amount of the reinforced fibers exceeds 2000 g/m², the drape property of the prepreg tends to worsen. A content rate of the fiber amount is preferably 60 to 90% by weight, more preferably 65 to 85% by weight and still more preferably 70 to 80% by weight. When the content rate of the fiber amount is less than 60% by weight, the amount of the resin is too much, the advantages of the fiber-reinforced composite material excellent in specific strength and specific elastic modulus are not obtained, and a heating value becomes sometimes too high upon being cured when the fiber-reinforced composite material is formed. When the content rate of the fiber amount exceeds 90% by weight, impregnation failure of the resin occurs, and the composite material likely has many voids.

The composite material according to the present invention is produced by the method in which the prepreg is molded and/or laminated and subsequently the resin is cured with heating as the pressure is imparted to the molded and/or laminated product.

Here, a press molding method, an autoclave molding method, a backing molding method, a wrapping tape method or an internal pressure molding method may be appropriately used as the method for imparting the heat and the pressure.

The wrapping tape method is the method of forming a tubular body made from the fiber-reinforced composite material by winding the prepreg onto a cored bar such as a mandrel, and is suitable for making a rod-shaped body such as a golf shaft and a fishing rod. More specifically, the tubular body is obtained by winding the prepreg around the mandrel, and winding a wrapping tape composed of a thermoplastic film outside the prepreg for fixing the prepreg and imparting the pressure, and then curing the resin with heating in the oven and then taking out the cored bar.

The internal pressure molding method is the molding method in which a preform obtained by winding the prepreg to an internal pressure imparting body such as a tube made from a thermoplastic resin is set in a mold, and then a gas is introduced with high pressure into the internal pressure imparting body to impart the pressure and simultaneously heating the mold. This method is preferably used for molding into complicate shaped bodies such as golf shafts, pads, rackets for tennis and badminton.

As to the fiber-reinforced composite material of the present invention, it is desirable that the glass transition temperature Tg measured by the differential scanning calorimeter (DSC) is preferably 100 to 180° C., more preferably 110 to 150° C. and still more preferably 120 to 140° C. When the glass transition temperature is lower than 100° C., the warp and the strain occur upon molding the fiber-reinforced composite material in some cases, and when used under high temperature environment, the fiber-reinforced composite material is deformed in some cases. When the glass transition temperature Tg exceeds 180° C., heat stress left in the fiber-reinforced composite material is increased, the cured material often becomes fragile, and the strength property of the resulting fiber-reinforced composite material is reduced in some cases. The glass transition temperature Tg of the fiber-reinforced composite material is estimated to be almost the same as Tg of the cured epoxy resin composition.

The fiber-reinforced composite material using the cured epoxy resin composition of the present invention as the matrix resin is suitably employed for sporting uses, general industrial uses and aerospace uses. More specifically, the fiber-reinforced composite material is suitably used in the sporting uses for the golf shafts, the fishing rods and the rackets for tennis and badminton, sticks for hockey and ski poles and the like. Also, it is suitably employed in the general industrial uses for structural materials for transport machines such as automobiles, ships and railroad vehicles, and driving shafts, plate springs, windmill blades, pressure vessel, fly wheels, rollers for paper making, roof materials, cables and repair and reinforcement materials.

The tubular body made from the fiber-reinforced composite material obtained by curing the prepreg of the present invention and making into a tubular shape may be suitably used for the golf shaft and the fishing rod.

EXAMPLES

Hereinafter, the present invention will be described in more detail with reference to Examples. Various physical properties were measured by the following methods. These physical properties were measured under the environment of temperature at 23° C. and relative humidity at 50% unless otherwise specified.

(1) Measurement of Reaction Initiation Temperature ($T_0$) of Constituent Element [1] ([A] Component)

Stoichiometric one equivalent of dicyandiamide (DICY7 supplied from Japan Epoxy Resin Co., Ltd., active hydrogen equivalent: 12 g/eq) was added to 100 parts by weight of a constituent element [1], and further 3 parts by weight of DCMU (DCMU 99 supplied from Hodogaya Chemical Co., Ltd.) was added thereto, and then the mixture was kneaded and dispersed. A small amount of this was collected, and a heat flow was measured at a temperature rising speed of 10° C./minute in the temperature measurement range of 0° C. to 350° C. using a differential scanning calorimeter under a nitrogen atmosphere. $T_0$ (exothermic rising temperature derived from curing reaction) is referred to as a temperature at which a DSC curve separates from the baseline due to the curing reaction, worked out from the temperature at which a tangent line to the DSC curve reaches the 1/10 slope of the slope of a tangent line to an inflection point on a side of the positive slope in a curing exothermic peak.

(2) Preparation of Resin Composition

Components other than a curing agent and a curing accelerator in predetermined amounts were added in a kneader, the temperature was raised to 160° C. with kneading them, and the mixture was kneaded at 160° C. for one hour to obtain a transparent viscous solution. The temperature was lowered to 80° C. with kneading this solution, and the curing agent and the curing accelerator in the predetermined amount were added and kneaded to obtain an epoxy resin composition. Component blended ratios in each Example and Comparative Example are shown in Tables 1 and 2. Molecular weights and others of raw materials used here are as follows.

<Amine-Type Epoxy Resin ([1]: [A] Component)>

Triglycidyl-p-aminophenol ("Araldite (registered trade name)" MY0500 supplied from Huntsman Advanced Materials GmbH, epoxy equivalent: 189, $T_0$: 122° C.)

Tetraglycidyldiaminodiphenylmethane ("Sumiepoxy (registered trade name)" ELM434 supplied from Sumitomo Chemical Co., Ltd., epoxy equivalent: 125, $T_0$: 135° C.)

Triglycidyl-p-amino-o-methylphenol ("Sumiepoxy (registered trade name)" ELM100 supplied from Sumitomo Chemical Co., Ltd., epoxy equivalent: 106, $T_0$: 132° C.)

<Bisphenol-Type Epoxy Resin ([2]: [B] Component)>

Bisphenol A-type epoxy resin ("jER (registered trade name)" 828, epoxy equivalent: 189, supplied from Japan Epoxy Resin Co., Ltd.)

Bisphenol A-type epoxy resin ("jER (registered trade name)" 1004, epoxy equivalent: 925, supplied from Japan Epoxy Resin Co., Ltd.)

Bisphenol F-type epoxy resin ("jER (registered trade name)" 4004P, epoxy equivalent: 800, supplied from Japan Epoxy Resin Co., Ltd.)

Bisphenol F-type epoxy resin ("Epotohto (registered trade name)" YDF2001 epoxy equivalent: 475, supplied from Tohto Kasei Co., Ltd.)

<Dicyandiamide ([3]: [C] Component)>

Dicyandiamide (curing agent, DICY7, active hydrogen group equivalent: 12, supplied from Japan Epoxy Resin Co., Ltd.)

<Block Copolymer ([4]: [D] Component)>

S-B-M Copolymer ("Nanostrength (registered trade name)" E40F: S is styrene (Tg: about 90° C.), B is 1,4-butadiene (Tg: about −90° C.), and M is methyl methacrylate (Tg: about 130° C.), supplied from Arkema);

M-B-M Copolymer "Nanostrength (registered trade name)" M22N: B is butyl acrylate (Tg: about −50° C.), M is a copolymer of methyl methacrylate and a monomer containing a polar functional group, (Tg: about 130° C.), supplied from Arkema).

<Other Components>

DCMU99 (3-(3,4-dichlorophenyl-1,1-dimethylurea, curing accelerator, supplied from Hodogaya Chemical Co., Ltd.)

4,4'-DDS (4,4'-diaminodiphenylsulfone, curing agent, supplied from Sumitomo Chemical Co., Ltd.)

"Vinylec (registered trade name)" E (polyvinyl formal, supplied from Chisso Corporation)

(3) Measurement of Viscosity in Resin Composition

The viscosity in the epoxy resin composition was worked out using a dynamic viscoelasticity measurement apparatus (ARES supplied from TA Instruments) and a parallel plate having a diameter of 40 mm, and measuring at frequency of 0.5 Hz at gap of 1 mm with simply raising the temperature at 2° C./minute.

(4) Measurement of Glass Transition Temperature of Cured Resin Material

A cured resin material having a thickness of 2 mm was obtained by defoaming an uncured resin composition in vacuum, and subsequently curing the resin composition at 130° C. for 2 hours in a mold set to make a thickness 2 mm by a spacer having the thickness of 2 mm and made from "Teflon (registered trade name)." A small amount of this was cut out, and its glass transition temperature was measured using the differential scanning calorimeter (DSC). A middle point of the temperature obtained based on JIS K7121 (1987) was determined as the glass transition temperature. As to the measurement condition, a temperature rising speed was 10° C./minute and a temperature measurement range was 0° C. to 350° C. under the nitrogen atmosphere.

(5) Measurement of Bending Elastic Modulus and Bending Flexure Amount of Cured Resin Material A test piece having a width of 10 mm and a length of 60 mm was cut out from the cured resin material obtained in the above (4) with the thickness of 2 mm, and a three-point bending test was carried out using Instron universal tester (supplied from Instron) at a span length of 32 mm at a cross head speed of 2.5 mm/minute according to JIS K7171 (1994), which obtained a bending elastic modulus and a bending flexure amount. A sample number was 5 (n=5), and the averages were compared.

(6) Measurement of Water Absorption Rate in Cured Resin Material

A test piece having the width of 50 mm and the length of 50 mm was cut out from the cured resin material obtained in the above (4) with the thickness of 2 mm, and dried in the oven kept at 50° C. for 24 hours. Subsequently, the test piece was cooled to room temperature in a desiccator, and then the weight of the test piece was measured at the level of 0.1 mg. Subsequently, the test piece was completely immersed in boiling distilled water in a container. After 360 hours, the test piece was removed from the boiling water, and placed in distilled water kept at room temperature to cool for 15 minutes. The cooled test piece was removed from the water, and the water on the surface was completely wiped out with dry fabric. Then, the test piece was precisely weighed down to 0.1 mg. The water absorption rate was calculated by the following formula.

Water absorption rate (%)=$(M_2-M_1)/M_1 \times 100$ $M_1$: Weight (mg) of test piece after being dried and before being immersed $M_2$: Weight (mg) of test piece after being immersed A measurement number was 3 (n=3), and the averages were compared.

(7) Measurement of Toughness ($K_{IC}$) in Cured Resin Material

A cured resin material having the thickness of 6 mm was obtained by defoaming an uncured resin composition in vacuum, and subsequently curing the resin composition in the mold set to make the thickness 6 mm by the spacer having the thickness of 6 mm and made from Teflon (registered trade name) at 130° C. for 2 hours. A test piece was obtained by cutting this cured resin material into the size of 12.7×150 mm. The test piece was processed and experimented using the Instron universal tester (supplied from Instron) according to ASTM D5045 (1999). An initial precrack was introduced into the test piece by touching a razor blade cooled to a liquid nitrogen temperature to the test piece and adding the impact to the razor with a hammer. The toughness of the cured resin material referred to as here indicates critical stress strength of a deformation mode I (open type).

(8) Measurement of Phase Separation Size

The cured resin material obtained in the above (4) was stained, and made into a thin slice; then, its transmission electron micrograph was acquired under the following condition using the transmission electron microscope (TEM). As the staining agent, $OsO_4$ or $RuO_4$ was used depending on the resin composition so that sufficient contrast was obtained in morphology.

Apparatus: H-7100 transmission electron microscope (supplied from Hitachi)

Acceleration voltage: 100 kV

In this way, the phase separation structure of an epoxy-rich phase and a block copolymer-rich phase can be observed. The sea-island structure in which the epoxy-rich phase that quantitatively occupies a majority becomes a continuous phase and the block copolymer-rich phase becomes the island phase is often formed, but there is also the case in which the continuous two-phase structure is formed. Thus, in the case of the sea-island structure, the major axes of all island phases present in the predetermined region were measured, and the number average value of them was determined as the phase separation size. When the phase separation size is predicted to be a 10 nm order (10 nm or more and less than 100 nm), the predetermined region is referred to as the region obtained by taking the micrograph at a magnification of 20,000 times and randomly selecting three regions having a square of 4 mm on the micrograph (region of the square of 200 nm on the sample). Likewise, when the phase separation size is predicted to be a 100 nm order (100 nm or more and less than 1000 nm), the predetermined region is referred to as the region obtained by taking the micrograph at a magnification of 2,000 times and randomly selecting three regions having the square of 4 mm on the micrograph (region of the square of 2 µm on the sample). When the phase separation size is predicted to be a 1 µm order (1 µm or more and less than 10 µm), the predetermined region is referred to as the region obtained by taking the micrograph at a magnification of 200 times and randomly selecting three regions having the square of 4 mm on the micrograph (region of the square of 20 µm on the sample). If the measured phase separation size is out of the predicted order, the region corresponding to the order is measured again at the corresponding magnification, and this result was employed. In the case of the continuous two-phase structure, a straight line having a predetermined length is drawn on the micrograph, an intersecting point of the straight line and a phase interface is picked up, a distance between the adjacent intersecting points is measured, and the number average value of them is determined as the phase separation size. When the phase separation size is predicted to be the 10 nm order (10 nm or more and less than 100 nm), the predetermined length is referred to as the length obtained by taking the micrograph at a magnification of 20,000 times and randomly selecting three lines having the length of 20 mm on the micrograph (length of 1000 nm on the sample). Likewise, when the phase separation size is predicted to be the 100 nm order (100 nm or more and less than 1000 nm), the predetermined length is referred to as the length obtained by taking the micrograph at a magnification of 2,000 times and randomly selecting three lines having the length of 20 mm on the micrograph (length of 10 µm on the sample). When the phase separation size is predicted to be the 1 µm order (1 µm or more and less than 10 µm), the predetermined length is referred to as the length obtained by taking the micrograph at a magnification of 200 times and randomly selecting three lines having the length of 20 mm on the micrograph (length of 100 µm on the sample). If the measured phase separation size is out of the predicted order, the length corresponding to the order is measured again at the corresponding magnification, and this result is employed. Upon measuring on the micrograph, the phase of 0.1 mm or more is determined as the island phase and measured (actually, the micrograph was expanded up to 5 times, and the phase of 0.5 mm or more was measured).

(9) Production of Prepreg

The resin composition was applied on a mold releasing paper using a reverse roll coater to make a resin film. Subsequently, the two resin films were overlapped on both sides of carbon fibers "Torayca (registered trade name)" T800 HB-12K (supplied from Toray Industries, Inc., tensile elastic modulus: 294 GPa, tensile strength: 5490 MPa) drawn up in one direction in a sheet shape, and then were heated and pressurized to impregnate the fibers with the resin composition. The unidirectional prepreg using T800HB was produced, of which a carbon fiber weight per unit area was 125 g/m$^2$ and a content rate of the fiber weight was 75%.

The unidirectional prepreg using M40SC, of which the carbon fiber weight per unit area was 125 g/m$^2$ and the content rate of the fiber weight was 75%, was produced in the same procedure as the above prepreg, except that carbon fibers Torayca M40SC-12K (supplied from Toray Industries, Inc., tensile elastic modulus: 380 GPa, tensile strength: 4900 MPa) was used as the additionally strengthened fibers.

(10) Production of Tubular Body Made from Composite Material for Torsional Strength Test A tubular body made from the composite material having an internal diameter of 10 mm was made by alternately laminating 3 plies of the unidirectional prepreg using M40SC so that fiber directions became 45° and −45° against a cylindrical axis direction and further laminating 3 plies of the unidirectional prepreg using T800H so that fiber directions became parallel to the cylindrical axis direction, according to the following manipulations (a) to (e). A round bar made from stainless having the diameter of 10 mm and the length of 1000 mm was used as the mandrel.

(a) Two plates having a rectangular shape having lengthwise 105 mm and crosswise 800 mm (so that a fiber axis direction became 45 degrees to a long side direction) were cut out from the unidirectional prepreg using M40SC produced according to the above (9). These two prepregs were attached so that their fiber directions were mutually crossed and displaced by 16 mm (corresponding to a semiperimeter of the mandrel) in a short side direction.

(b) The mandrel was turned around so that the long side of the rectangular shape of the prepreg attached to the mandrel treated with a mold releasing agent and the axis direction of the mandrel became the same direction.

(c) Thereon, a rectangular shaped-prepreg having lengthwise 115 mm and crosswise 800 mm (the long side direction became the fiber axis direction) cut out from the unidirectional prepreg using T800HB produced according to the above (9) was winded on the mandrel so that the fiber direction became the same as the axis direction of the mandrel.

(d) Further thereon, a wrapping tape (heat resistant film tape) was winded to cover the winded matter, and they were molded with heating at 130° C. for 90 minutes in a curing furnace. The wrapping tape had the width of 15 mm, a tensile force of 3.0 kg and a winding pitch (displaced amount upon being winded) of 1.0 mm, and 2 plies of this were wrapped.

(e) Subsequently, the mandrel was taken out, and the wrapping tape was removed to obtain the tubular body made from the composite material.

(11) Torsional Strength Test of Tubular Body Made from Composite Material

A test piece having the length of 400 mm was cut out from the tubular body made from the composite material obtained in the above (10), and measured according to a torsion test described in "Approval Standard and Standard Conformation Method for Shaft for Golf Club" (edited by Consumer Product Safety Association, 5 San No. 2087 approved by Minister of International Trade and Industry in 1993).

Here, a test piece gauge length was 300 mm, and 50 mm of both ends of the test piece were supported with fixtures to measure the torsional strength. The torsional strength was calculated by the following formula.

Torsional strength (N·m·deg.)=Breaking torque (N·m)×Torsion angle upon breaking (deg.)

The result of the torsional strength test is the indicator of the static strength property of the tubular body made from the composite material, and when the tubular body has the torsional strength of 2300 N·m·deg or more, it can be said that the tubular body is excellent in static strength property.

(12) Production of Tubular Body Made from Composite Material for Charpy Impact Test A tubular body made from the composite material having the same constitution as in the (10) was produced by the following manipulations (a) to (e) except for the internal diameter being 6.3 mm. A round bar made from stainless having the diameter of 6.3 mm and the length of 1000 mm was used as the mandrel.

(a) Two plates having the rectangular shape having lengthwise 68 mm and crosswise 800 mm (so that the fiber axis direction became 45 degrees to the long side direction) were cut out from the unidirectional prepreg using M40SC produced according to the above (9). These two prepregs were attached so that their fiber directions were mutually crossed and displaced by 16 mm (corresponding to the semiperimeter of the mandrel) in the short side direction.

(b) The mandrel was turned around so that the long side of the rectangular shape of the prepreg attached to the mandrel treated with the mold releasing agent and the axis direction of the mandrel became the same direction.

(c) Thereon, a rectangular shaped prepreg having lengthwise 80 mm and crosswise 800 mm (the long side direction became the fiber axis direction) cut out from the unidirectional prepreg using T800HB produced according to above (9) was winded on the mandrel so that the fiber direction became the same as the axis direction of the mandrel.

(d) Further thereon, the wrapping tape (heat resistant film tape) was winded to cover the winded matter, and they were molded with heating at 130° C. for 90 minutes in the curing furnace. The wrapping tape had the width of 15 mm, the tensile force of 3.0 kg and the winding pitch (displaced amount upon being winded) of 1.0 mm, and 2 plies of this were wrapped.

(e) Subsequently, the mandrel was taken out, and the wrapping tape was removed to obtain the tubular body made from the composite material.

(13) Charpy Impact Test of Tubular Body Made from Composite Material

A test piece having the internal diameter of 6.3 mm and the length of 60 mm was made by cutting the tubular body made from the composite material obtained in above the (12) with the length of 60 mm. Charpy impact test was carried out by giving the impact with weighing of 300 k·cm to a side face of the tubular body. Absorbed energy of the impact was calculated from a swing angle according to the following formula.

$$E = WR[(\cos\beta - \cos\alpha) - (\cos\alpha' - \cos\alpha)(\alpha+\beta)/(\alpha+\alpha')]$$

E: Absorbed energy (J)
WR: Moment around rotation axis of hammer (N·m)
α: Hammer lift angle (°)
α': Swing angle (°) when the hammer swings air from the hammer lift angle α
β: Hammer swing angle (°) after fracture of test piece No notch was introduced into the test piece. The measured number was 5 (n=5), and the averages were compared. The result of the Charpy impact test is the indicator of the impact resistance in the tubular body made from composite material, and when the tubular body has the absorbed energy of 10 J or more, it can be said that the tubular body is excellent in impact resistance.

According to the above methods, the epoxy resin composition, the prepreg and the tubular body made from the fiber-reinforced composite material were made in each Example and Comparative Example, and their properties were measured. The results are collectively shown in Tables 1 and 2.

Example 1

When MY0500 having $T_0$ of 122° C. was used as the [1] and "Nanostrength (registered trade name)" E40F was used as the [4], the slightly rough and large phase separation size was obtained, but the dynamic property of the tubular body was good, as shown in Table 1.

Example 2

The thermosetting resin composition was prepared in the same manner as in Example 1, except that "Nanostrength (registered trade name)" M22N was used as the [4]. Compared with Example 1, the phase separation size became fine. As the result, the resin bending flexure amount and the resin toughness were enhanced, and the dynamic property of the tubular body was also enhanced.

Example 3

The thermosetting resin composition was prepared in the same manner as in Example 2, except that ELM100 having $T_0$ of 132° C. was used as [1]. Compared with Examples 1 and 2, the phase separation size became finer. As the result, the resin toughness was largely enhanced, and Charpy impact strength of the tubular body was largely enhanced.

Examples 4 and 5

The thermosetting resin composition was prepared in the same manner as in Example 3, except that the composition ratio of the [2] was changed and the content rate of the bisphenol F-type epoxy resin occupying in the [2] was changed from 29% to 57% or 86%. Compared with Examples 1 to 3, both the resin bending elastic modulus and the resin toughness were enhanced. As the result, both the torsional strength and Charpy impact strength of the tubular bodies were enhanced.

Example 6

The thermosetting resin composition was prepared in the same manner as in Example 5, except that the amount of blended the [4] was reduced to 1.5 parts by weight. Compared with Example 5, the resin toughness was slightly reduced. As the result, Charpy impact strength of the tubular body was slightly reduced, but the torsional strength was enhanced and there was no problem in the dynamic property of the tubular body.

Example 7

The thermosetting resin composition was prepared in the same manner as in Example 5, except that the amount of blended the [4] was increased to 8 parts by weight. Compared with Example 5, the resin bending elastic modulus was slightly low. As the result, the torsional strength of the tubular body was also slightly reduced, but the resin toughness was further enhanced. Thus, Charpy impact strength of the tubular body was further enhanced, and there was no problem in the dynamic property of the tubular body.

Example 8

The thermosetting resin composition was prepared in the same manner as in Example 5, except that the amount of blended the [1] was reduced to 15 parts by weight and, in conjunction with this, the composition ratio of [2] was slightly changed. Compared with Example 5, the resin bending elastic modulus was slightly reduced. As the result, the torsional strength of the tubular body was also slightly reduced, but Charpy impact strength of the tubular body was enhanced, and there was no problem in the dynamic property of the tubular body.

Example 9

The thermosetting resin composition was prepared in the same manner as in Example 5, except that the amount of blended the [1] was increased to 55 parts by weight and the composition ratio of the [2] was slightly changed in conjunction with this. Compared with Example 5, Charpy impact strength of the tubular body was slightly reduced in conjunction with the slight reduction of the resin toughness, but the resin bending elastic modulus was enhanced, and also from the balance with the torsional strength of the tubular body, there was no problem in the dynamic property of the tubular body.

Example 10

The thermosetting resin composition was prepared in the same manner as in Example 5, except that the amount of blended the [3] was reduced to 2.5 parts by weight. Compared with Example 5, the torsional strength of the tubular body was slightly reduced in conjunction with the slight reduction of the resin bending elastic modulus, but as the result of the enhanced resin toughness, Charpy impact strength of the tubular body was enhanced, and there was no problem in the dynamic property of the tubular body.

Example 11

The thermosetting resin composition was prepared in the same manner as in Example 5, except that the amount of blended the [3] was reduced to 3.9 parts by weight. Compared with Example 5, as the result of enhancing the resin toughness, it was found that Charpy impact strength of the tubular body was enhanced, and the torsional strength of the tubular body was also enhanced, and thus the tubular body had the excellent dynamic property.

Example 12

The thermosetting resin composition was prepared in the same manner as in Example 11, except that the amount of blended DCMU was reduced to 0.5 parts by weight. Compared with Example 11, both the bending elastic modulus and the resin toughness were slightly reduced. As the result, although both the torsional strength and Charpy impact strength of the tubular body were slightly reduced, there was no problem in the dynamic property of the tubular body.

Example 13

The thermosetting resin composition was prepared in the same manner as in Example 11, except that the amount of blended DCMU was reduced to 2.0 parts by weight. Compared with Example 11, as the result of largely enhancing both the resin elastic modulus and the resin toughness, it was shown that both the torsional strength and Charpy impact strength of the tubular body were largely enhanced, and the tubular body exhibiting the excellent dynamic property was obtained.

Example 14

The thermosetting resin composition was prepared in the same manner as in Example 5, except that the amount of ELM434 as the [1] was 30 parts by weight and "jER (registered trade name)" 1004 as the [2] was replaced with "jER (registered trade name)" 4004P. Compared with Example 5, the phase separation size became much finer. As the result, the resin toughness was further enhanced, and Charpy impact strength of the tubular body was further enhanced.

Comparative Example 1

The thermosetting resin composition was prepared in the same manner as in Example 3, except that 80 parts by weight of ELM434 as the [1] and 20 parts by weight of "jER (registered trade name)" 828 as the [2] were blended. The resin bending flexure amount and the resin toughness were reduced. As the result, the torsional strength and Charpy impact strength of the tubular body became very low.

Comparative Example 2

The thermosetting resin composition was prepared in the same manner as in Example 3, except that the total amount of ELM100 as the [1] was replaced with "jER (registered trade name)" 828 as the [2]. The resin bending elastic modulus was largely reduced. As the result, the torsional strength of the tubular body was largely reduced and became insufficient.

Comparative Example 3

The thermosetting resin composition was prepared in the same manner as in Example 5, except that the total amount of ELM100 as the [1] was replaced with "jER (registered trade name)" 828 as the [2]. The resin bending elastic modulus was largely reduced. As the result, the torsional strength of the tubular body was largely reduced and became insufficient.

Comparative Example 4

The thermosetting resin composition was prepared in the same manner as in Example 2, except that the total amount of "Nanostrength (registered trade name)" M22N was replaced with "Vinylec (registered trade name)" E. The resin bending flexure amount and the resin toughness were largely reduced. As the result, Charpy impact strength of the tubular body was largely reduced and became insufficient. In this Comparative Example, no phase separation structure was formed because the block copolymer containing the block incompatible with epoxy was not contained.

Comparative Example 5

The thermosetting resin composition was prepared in the same manner as in Example 5, except that 28 parts by weight of 4,4'-DDS was blended instead of not blending the [3]. The resin bending flexure amount and the resin toughness were largely reduced. As the result, both the torsional strength and Charpy impact strength of a tubular body were largely reduced and became insufficient.

TABLE 1

| | MATERIAL NAME | EXAMPLE 1 | EXAMPLE 2 | EXAMPLE 3 | EXAMPLE 4 |
|---|---|---|---|---|---|
| AMINE-TYPE EPOXY RESIN [1] | TRIGLYCIDYL-p-AMINOPHENOL (MY0500) | 30 | 30 | | |
| | TRIGLYCIDYL-p-AMINO-o-METHYLPHENOL (ELM100) | | | 30 | 30 |
| | TETRAGLYCIDYL DIAMINODIPHENYL METHANE (ELM434) | | | | |
| BISPHENOL-TYPE EPOXY RESIN [2] | BISPHENOL A-TYPE EPOXY RESIN (jER 828) | 20 | 20 | 20 | 10 |
| | BISPHENOL A-TYPE EPOXY RESIN (jER 1004) | 30 | 30 | 30 | 20 |
| | BISPHENOL F-TYPE EPOXY RESIN (jER4004P) | 10 | 10 | 10 | 10 |
| | BISPHENOL F-TYPE EPOXY RESIN (YDF2001) | 10 | 10 | 10 | 30 |
| DICYANDIAMIDE [3] | DICYANDIAMIDE (CURING AGGENT) | 5.0 | 5.0 | 5.0 | 5.0 |
| BOLOCK COPOLYMER [4] | S-B-M COPOLYMER (Nanostrength E40F) | 4 | | | |
| | M-B-M COPOLYMER (Nanostrength M22N) | | 4 | 4 | 4 |
| OTHERS | DCMU (CURING ACCELERATOR) | 3.0 | 3.0 | 3.0 | 3.0 |
| | 4,4'-DDS (CURING AGENT) | | | | |
| | POLYVINYL FORMAL (VINYLEC E) | | | | |
| REACTION-INITIATION TEMPERATURE (° C.) OF AMINE-TYPE EPOXY RESIN [1] | | 122 | 122 | 132 | 132 |
| CONTENT RATE (WEIGHT %) OF BISPHENOL F-TYPE EPOXY RESIN IN BISPHENOL-TYPE EPOXY RESIN [2] | | 29 | 29 | 29 | 57 |
| AVERAGE EPOXY EQUIVALENT AMOUNT OF BISPHENOL-TYPE EPOXY RESIN [2] | | 407 | 407 | 407 | 466 |
| NUMBER OF THE ACTIVE HYDROGEN GROUP OF DICYANDIAMIDE (EQUIVALENT AMOUNT) TO ONE EQUIVALENT OF EPOXY GROUP WITHIN TOTAL EPOXY RESIN COMPONENTS | | 0.9 | 0.9 | 0.9 | 1.0 |
| POLYMER PROPERTIES | VISCOSITY (Pa·s@80° C.) | 57 | 52 | 42 | 40 |
| | GLASS TRANSITION TEMPERATURE (° C.) | 127 | 128 | 123 | 120 |
| | BENDING ELASTICITY MODULUS (GPa) | 3.5 | 3.5 | 3.6 | 3.7 |
| | BENDING FLEXURE AMOUNT (mm) | 6 | 7 | 7 | 8 |
| | TOUGHNESS ($K_{IC}$) | 1.3 | 1.4 | 1.6 | 1.7 |
| | PHASE SEPARATION SIZE (nm) | 700 | 160 | 60 | 50 |
| | WATER ABSORPTION RATE (%) | 5.9 | 5.8 | 5.9 | 6.0 |
| COMPOSIT PROPERTY (TUBULAR SHAPED BODY) | TORSIONAL STRENGTH (N·m·deg) | 2420 | 2610 | 2660 | 2800 |
| | CHARPY IMPACT VALUE (J) | 10.2 | 10.7 | 11.5 | 11.9 |

| | MATERIAL NAME | EXAMPLE 5 | EXAMPLE 6 | EXAMPLE 7 | EXAMPLE 8 |
|---|---|---|---|---|---|
| AMINE-TYPE EPOXY RESIN [1] | TRIGLYCIDYL-p-AMINOPHENOL (MY0500) | | | | |
| | TRIGLYCIDYL-p-AMINO-o-METHYLPHENOL (ELM100) | 30 | 30 | 30 | 15 |
| | TETRAGLYCIDYL DIAMINODIPHENYL METHANE (ELM434) | | | | |
| BISPHENOL-TYPE EPOXY RESIN [2] | BISPHENOL A-TYPE EPOXY RESIN (jER 828) | | | | 35 |
| | BISPHENOL A-TYPE EPOXY RESIN (jER 1004) | 10 | 10 | 10 | 30 |
| | BISPHENOL F-TYPE EPOXY RESIN (jER4004P) | 10 | 10 | 10 | 20 |
| | BISPHENOL F-TYPE EPOXY RESIN (YDF2001) | 50 | 50 | 50 | |
| DICYANDIAMIDE [3] | DICYANDIAMIDE (CURING AGGENT) | 5.0 | 5.0 | 5.0 | 5.0 |
| BOLOCK COPOLYMER [4] | S-B-M COPOLYMER (Nanostrength E40F) | | | | |
| | M-B-M COPOLYMER (Nanostrength M22N) | 4 | 1.5 | 8 | 4 |
| OTHERS | DCMU (CURING ACCELERATOR) | 3.0 | 3.0 | 3.0 | 3.0 |
| | 4,4'-DDS (CURING AGENT) | | | | |
| | POLYVINYL FORMAL (VINYLEC E) | | | | |
| REACTION-INITIATION TEMPERATURE (° C.) OF AMINE-TYPE EPOXY RESIN [1] | | 132 | 132 | 132 | 132 |
| CONTENT RATE (WEIGHT %) OF BISPHENOL F-TYPE EPOXY | | 86 | 86 | 86 | 24 |

TABLE 1-continued

|  |  | | | | |
|---|---|---|---|---|---|
| | RESIN IN BISPHENOL-TYPE EPOXY RESIN [2] | | | | |
| | AVERAGE EPOXY EQUIVALENT AMOUNT OF BISPHENOL-TYPE EPOXY RESIN [2] | 544 | 544 | 544 | 350 |
| | NUMBER OF THE ACTIVE HYDROGEN GROUP OF DICYANDIAMIDE (EQUIVALENT AMOUNT) TO ONE EQUIVALENT OF EPOXY GROUP WITHIN TOTAL EPOXY RESIN COMPONENTS | 1.0 | 1.0 | 1.0 | 1.1 |
| POLYMER PROPERTIES | VISCOSITY (Pa · s@80° C.) | 36 | 7 | 230 | 44 |
| | GLASS TRANSITION TEMPERATURE (° C.) | 119 | 118 | 117 | 122 |
| | BENDING ELASTICITY MODULUS (GPa) | 3.8 | 3.9 | 3.7 | 3.4 |
| | BENDING FLEXURE AMOUNT (mm) | 9 | 8 | 11 | 8 |
| | TOUGHNESS ($K_{IC}$) | 1.9 | 1.3 | 2.6 | 1.8 |
| | PHASE SEPARATION SIZE (nm) | 50 | 40 | 70 | 40 |
| | WATER ABSORPTION RATE (%) | 6.1 | 6.2 | 5.8 | 5.5 |
| COMPOSIT PROPERTY (TUBULAR SHAPED BODY) | TORSIONAL STRENGTH (N · m · deg) | 2930 | 2980 | 2720 | 2390 |
| | CHARPY IMPACT VALUE (J) | 12.7 | 10.9 | 13.5 | 12.8 |

| | MATERIAL NAME | EXAMPLE 9 | EXAMPLE 10 | EXAMPLE 11 | EXAMPLE 12 |
|---|---|---|---|---|---|
| AMINE-TYPE EPOXY RESIN [1] | TRIGLYCIDYL-p-AMINOPHENOL (MY0500) | | | | |
| | TRIGLYCIDYL-p-AMINO-o-METHYLPHENOL (ELM100) | 30 | 30 | 30 | 30 |
| | TETRAGLYCIDYL DIAMINODIPHENYL METHANE (ELM434) | 25 | | | |
| BISPHENOL-TYPE EPOXY RESIN [2] | BISPHENOL A-TYPE EPOXY RESIN (jER 828) | | | | |
| | BISPHENOL A-TYPE EPOXY RESIN (jER 1004) | 25 | 10 | 10 | 10 |
| | BISPHENOL F-TYPE EPOXY RESIN (jER4004P) | 20 | 10 | 10 | 10 |
| | BISPHENOL F-TYPE EPOXY RESIN (YDF2001) | | 50 | 50 | 50 |
| DICYANDIAMIDE [3] | DICYANDIAMIDE (CURING AGGENT) | 5.0 | 2.5 | 3.9 | 3.9 |
| BOLOCK COPOLYMER [4] | S-B-M COPOLYMER (Nanostrength E40F) | | | | |
| | M-B-M COPOLYMER (Nanostrength M22N) | 4 | 4 | 4 | 4 |
| OTHERS | DCMU (CURING ACCELERATOR) | 3.0 | 3.0 | 3.0 | 0.5 |
| | 4,4'-DDS (CURING AGENT) | | | | |
| | POLYVINYL FORMAL (VINYLEC E) | | | | |
| | REACTION-INITIATION TEMPERATURE (° C.) OF AMINE-TYPE EPOXY RESIN [1] | 133 | 132 | 132 | 132 |
| | CONTENT RATE (WEIGHT %) OF BISPHENOL F-TYPE EPOXY RESIN IN BISPHENOL-TYPE EPOXY RESIN [2] | 44 | 86 | 86 | 86 |
| | AVERAGE EPOXY EQUIVALENT AMOUNT OF BISPHENOL-TYPE EPOXY RESIN [2] | 865 | 544 | 544 | 544 |
| | NUMBER OF THE ACTIVE HYDROGEN GROUP OF DICYANDIAMIDE (EQUIVALENT AMOUNT) TO ONE EQUIVALENT OF EPOXY GROUP WITHIN TOTAL EPOXY RESIN COMPONENTS | 0.8 | 0.5 | 0.8 | 0.8 |
| POLYMER PROPERTIES | VISCOSITY (Pa · s@80° C.) | 49 | 35 | 36 | 36 |
| | GLASS TRANSITION TEMPERATURE (° C.) | 142 | 114 | 117 | 105 |
| | BENDING ELASTICITY MODULUS (GPa) | 3.9 | 3.6 | 3.8 | 3.4 |
| | BENDING FLEXURE AMOUNT (mm) | 5 | 11 | 11 | 6 |
| | TOUGHNESS ($K_{IC}$) | 1.5 | 2.1 | 2.2 | 1.2 |
| | PHASE SEPARATION SIZE (nm) | 240 | 50 | 50 | 40 |
| | WATER ABSORPTION RATE (%) | 6.5 | 4.9 | 5.5 | 6.5 |
| COMPOSIT PROPERTY (TUBULAR SHAPED BODY) | TORSIONAL STRENGTH (N · m · deg) | 2540 | 2700 | 2950 | 2350 |
| | CHARPY IMPACT VALUE (J) | 10.8 | 12.9 | 13.0 | 10.0 |

| | MATERIAL NAME | EXAMPLE 13 | EXAMPLE 14 |
|---|---|---|---|
| AMINE-TYPE EPOXY RESIN [1] | TRIGLYCIDYL-p-AMINOPHENOL (MY0500) | | |
| | TRIGLYCIDYL-p-AMINO-o-METHYLPHENOL (ELM100) | 30 | |
| | TETRAGLYCIDYL DIAMINODIPHENYL METHANE (ELM434) | | 30 |
| BISPHENOL-TYPE EPOXY RESIN [2] | BISPHENOL A-TYPE EPOXY RESIN (jER 828) | | |
| | BISPHENOL A-TYPE EPOXY RESIN (jER 1004) | 10 | |
| | BISPHENOL F-TYPE EPOXY RESIN (jER4004P) | 10 | 20 |
| | BISPHENOL F-TYPE EPOXY RESIN (YDF2001) | 50 | 50 |
| DICYANDIAMIDE [3] | DICYANDIAMIDE (CURING AGGENT) | 3.9 | 5.0 |
| BOLOCK COPOLYMER [4] | S-B-M COPOLYMER (Nanostrength E40F) | | |
| | M-B-M COPOLYMER (Nanostrength M22N) | 4 | 4 |
| OTHERS | DCMU (CURING ACCELERATOR) | 2.0 | 3.0 |
| | 4,4'-DDS (CURING AGENT) | | |
| | POLYVINYL FORMAL (VINYLEC E) | | |
| | REACTION-INITIATION TEMPERATURE (° C.) OF AMINE-TYPE EPOXY RESIN [1] | 132 | 135 |
| | CONTENT RATE (WEIGHT %) OF BISPHENOL F-TYPE EPOXY RESIN IN BISPHENOL-TYPE EPOXY RESIN [2] | 86 | 100 |
| | AVERAGE EPOXY EQUIVALENT AMOUNT OF BISPHENOL-TYPE EPOXY RESIN [2] | 544 | 537 |
| | NUMBER OF THE ACTIVE HYDROGEN GROUP OF DICYANDIAMIDE (EQUIVALENT AMOUNT) TO ONE EQUIVALENT OF EPOXY GROUP WITHIN TOTAL EPOXY RESIN COMPONENTS | 0.8 | 1.1 |

TABLE 1-continued

| | | | | |
|---|---|---|---|---|
| POLYMER PROPERTIES | VISCOSITY (Pa · s@80° C.) | | 36 | 190 |
| | GLASS TRANSITION TEMPERATURE (° C.) | | 122 | 120 |
| | BENDING ELASTICITY MODULUS (GPa) | | 4.0 | 3.8 |
| | BENDING FLEXURE AMOUNT (mm) | | 13 | 10 |
| | TOUGHNESS ($K_{IC}$) | | 2.8 | 2.0 |
| | PHASE SEPARATION SIZE (nm) | | 50 | 30 |
| | WATER ABSORPTION RATE (%) | | 5.3 | 6.3 |
| COMPOSIT PROPERTY (TUBULAR SHAPED BODY) | TORSIONAL STRENGTH (N · m · deg) | | 3110 | 3020 |
| | CHARPY IMPACT VALUE (J) | | 13.9 | 13.1 |

TABLE 2

| | MATERIAL NAME | COMPARATIVE EXCEMPLE 1 | COMPARATIVE EXCEMPLE 2 | COMPARATIVE EXCEMPLE 3 | COMPARATIVE EXCEMPLE 4 | COMPARATIVE EXCEMPLE 5 |
|---|---|---|---|---|---|---|
| AMINE-TYPE EPOXY RESIN [1] | TRIGLYCIDYL-p-AMINOPHENOL (MY0500) | | | | 30 | |
| | TRIGLYCIDYL-p-AMINO-o-METHYLPHENOL (ELM100) | | | | | 30 |
| | TETRAGLYCIDYL DIAMINODIPHENYL METHANE (ELM434) | 80 | | | | |
| BISPHENOL-TYPE EPOXY RESIN [2] | BISPHENOL A-TYPE EPOXY RESIN (jER 828) | 20 | 50 | 30 | 20 | |
| | BISPHENOL A-TYPE EPOXY RESIN (jER 1004) | | 30 | 10 | 30 | 10 |
| | BISPHENOL F-TYPE EPOXY RESIN (jER4004P) | | 10 | 10 | 10 | 10 |
| | BISPHENOL F-TYPE EPOXY RESIN (YDF2001) | | 10 | 50 | 10 | 50 |
| DICYANDIAMIDE [3] | DICYANDIAMIDE (CURING AGGENT) | 5.0 | 5.0 | 5.0 | 5.0 | |
| BOLOCK COPOLYMER [4] | S-B-M COPOLYMER (Nanostrength E40F) | | | | | |
| | M-B-M COPOLYMER (Nanostrength M22N) | 4 | 4 | 4 | | 4 |
| OTHERS | DCMU (CURING ACCELERATOR) | 3.0 | 3.0 | 3.0 | 3.0 | |
| | 4,4'-DDS (CURING AGENT) | | | | | 28 |
| | POLYVINYL FORMAL (VINYLEC E) | | | | 4 | |
| REACTION-INITIATION TEMPERATURE (° C.) OF AMINE-TYPE EPOXY RESIN [1] | | 135 | — | — | 122 | 132 |
| CONTENT RATE (WEIGHT %) OF BISPHENOL F-TYPE EPOXY RESIN IN BISPHENOL-TYPE EPOXY RESIN [2] | | 0 | 20 | 60 | 29 | 86 |
| AVERAGE EPOXY EQUIVALENT AMOUNT OF BISPHENOL-TYPE EPOXY RESIN [2] | | 189 | 303 | 348 | 407 | 544 |
| NUMBER OF THE ACTIVE HYDROGEN GROUP OF DICYANDIAMIDE (EQUIVALENT AMOUNT) TO ONE EQUIVALENT OF EPOXY GROUP WITHIN TOTAL EPOXY RESIN COMPONENTS | | 0.5 | 1.3 | 1.5 | 0.9 | 0 |
| POLYMER PROPERTIES | VISCOSITY (Pa · s@80° C.) | 21 | 80 | 60 | 40 | 43 |
| | GLASS TRANSITION TEMPERATURE (° C.) | 151 | 114 | 111 | 126 | 141 |
| | BENDING ELASTICITY MODULUS (GPa) | 3.6 | 3.2 | 3.5 | 3.5 | 3.7 |
| | BENDING FLEXURE AMOUNT (mm) | 4 | 10 | 10 | 5 | 7.4 |
| | TOUGHNESS ($K_{IC}$) | 1.2 | 1.7 | 1.8 | 0.9 | 1.3 |
| | PHASE SEPARATION SIZE (nm) | 50 | 60 | 50 | — | 30 |
| | WATER ABSORPTION RATE (%) | 7.5 | 5.5 | 5.4 | 6.2 | 6.7 |
| COMPOSIT PROPERTY (TUBULAR SHAPED BODY) | TORSIONAL STRENGTH (N · m · deg) | 1650 | 1940 | 2070 | 2130 | 1720 |
| | CHARPY IMPACT VALUE (J) | 8.2 | 10.8 | 11.1 | 9.2 | 8.9 |

Industrial Applicability

The epoxy resin composition of the present invention gives the cured material sufficiently having the heat resistance, the plastic deformation capacity and the toughness as well as having the high elastic modulus when cured. Thus, particularly, even when the epoxy resin composition of the present invention is combined with the reinforced fibers having the high tensile elastic modules, it is possible to obtain the fiber-reinforced composite material that is excellent in static strength property and is excellent in impact resistance. This enables to apply the fibers having the high elastic modulus to the uses and sites to which they have been difficult to be applied. It is anticipated that further weight lightening of the fiber-reinforced composite material is promoted in various fields.

The invention claimed is:

1. An epoxy resin composition comprising [A] to [D]:
   [A] 10 to 50 parts by weight, in 100 parts by weight of total epoxy resins, of an amine epoxy resin;
   [B] 40 to 90 parts by weight, in 100 parts by weight of total epoxy resins, of a bisphenol epoxy resin;
   [C] 1 to 10 parts by weight of dicyandiamide or a derivative thereof; and
   [D] 1 to 10 parts by weight of at least one block copolymer selected from the group consisting of S-B-M, B-M and M-B-M, each block of S, B and M being linked by covalent bonding or being bound to one block through formation of one covalent bond and linked to another block via an intermediate molecule bound through formation of another covalent bond, the block M being a homopolymer of methyl methacrylate or a copolymer containing methyl methacrylate in an amount of at least 50% by weight, the block B being incompatible with epoxy resin and the block M and having a glass transition temperature Tg of 20° C. or below, and the block S being incompatible with epoxy resin, the block B and the block M and having a glass transition temperature Tg higher than the glass transition temperature Tg of the block B,
   wherein the amine epoxy resin [A] has a reaction initiation temperature within a range of 130 to 150° C., measured under conditions such that one stoichiometric equivalent of dicyandiamide and three parts by weight of 3-(3,4-dichlorophenyl)-1,1-dimethylurea are blended with 100 parts by weight of the amine epoxy resin and the temperature is raised at a temperature-rising speed of 10° C./minute.

2. The epoxy resin composition according to claim 1, wherein 20 to 90 parts by weight of bisphenol epoxy resin [B] comprises bisphenol F epoxy resin.

3. The epoxy resin composition according to claim 1, wherein the average epoxy equivalent in the bisphenol epoxy resin [B] is within a range of 300 to 800.

4. The epoxy resin composition according to claim 1, wherein the block B in the block copolymer [D] is poly 1,4-butadiene or poly(butyl acrylate).

5. The epoxy resin composition according to claim 1, wherein the size of the phase separation structure of the epoxy resin composition is within the range of 10 to 1000 nm when cured at 130° C. for 2 hours.

6. The epoxy resin composition according to claim 1, wherein the dicyandiamide or derivative thereof [C] includes an active hydrogen group within a range of 0.6 to 0.9 equivalents to one equivalent of epoxy groups in the total epoxy resin component.

7. A prepreg comprising a matrix composed of the epoxy resin composition according to claim 1.

8. A fiber-reinforced composite material obtained by laminating and curing the prepreg according to claim 7.

9. A tubular body made from a fiber-reinforced composite material obtained by laminating and curing the prepreg according to claim 7 into a tubular shape.

10. The epoxy resin composition according to claim 1, wherein the block B of block copolymer [D] is a polydiene selected from the group consisting of polybutadiene, polyisoprene, random copolymers thereof, and completely hydrogenated polydienes.

11. The epoxy resin composition according to claim 1, wherein the block S of block copolymer [D] is obtained from styrene, a-methylstyrene, vinyl toluene, and an alkyl acid and/or alkyl ester of methacrylic acid having an alkyl chain of 1 to 18 carbon atoms.

12. The epoxy resin composition according to claim 10, wherein the block S of block copolymer [D] is obtained from styrene, α-methylstyrene, vinyl toluene, and an alkyl acid and/or alkyl ester of methacrylic acid having an alkyl chain of 1 to 18 carbon atoms.

* * * * *